(12) United States Patent
Wagaj et al.

(10) Patent No.: US 11,092,430 B2
(45) Date of Patent: Aug. 17, 2021

(54) MEASUREMENT OF TOOTHED ARTICLES UTILIZING MULTIPLE SENSORS

(71) Applicant: GLEASON METROLOGY SYSTEMS CORPORATION, Dayton, OH (US)

(72) Inventors: Parag P. Wagaj, Springboro, OH (US); Ethan James Shepherd, West Carrollton, OH (US); Michael Tanner, Cincinnati, OH (US); Justin Shultz, Franklin, OH (US); Ronald E. Mack, Dayton, OH (US); Douglas Charles Beerck, Dayton, OH (US)

(73) Assignee: GLEASON METROLOGY SYSTEMS CORPORATION, Dayton, OH (US)

( * ) Notice: Subject to any disclaimer, the term of this patent is extended or adjusted under 35 U.S.C. 154(b) by 0 days.

(21) Appl. No.: 16/329,288

(22) PCT Filed: Sep. 6, 2017

(86) PCT No.: PCT/US2017/050235
§ 371 (c)(1),
(2) Date: Feb. 28, 2019

(87) PCT Pub. No.: WO2018/048872
PCT Pub. Date: Mar. 15, 2018

(65) Prior Publication Data
US 2019/0249983 A1      Aug. 15, 2019

Related U.S. Application Data

(60) Provisional application No. 62/385,520, filed on Sep. 9, 2016.

(51) Int. Cl.
*G01B 11/24* (2006.01)
*G01B 5/008* (2006.01)
*G01B 5/20* (2006.01)

(52) U.S. Cl.
CPC .......... *G01B 11/2416* (2013.01); *G01B 5/008* (2013.01); *G01B 5/202* (2013.01)

(58) Field of Classification Search
CPC ..... G01B 11/2416; G01B 5/008; G01B 5/202
See application file for complete search history.

(56) References Cited

U.S. PATENT DOCUMENTS 4,547,674 A * 10/1985 Pryor ................... G01S 17/48
                                                      250/559.23
5,297,055 A    3/1994  Johnstone
(Continued)

FOREIGN PATENT DOCUMENTS

DE    4216779 A1 * 12/1992  ............ G01B 5/202
DE    4216779 A1   12/1992
WO    94/14029 A1   6/1994

OTHER PUBLICATIONS

International Search Report and Written Opinion for PCT/US2017/050235, ISA/EPO, dated Oct. 23, 2017, 12 pgs.

*Primary Examiner* — Violeta A Prieto
(74) *Attorney, Agent, or Firm* — Robert L. McDowell

(57) ABSTRACT

A method and machine whereby utilizing both tactile (46) and non-contact (50) sensors or probes for workpiece (56) inspection and/or measurement results in significant cycle time savings while accuracy is maintained.

5 Claims, 7 Drawing Sheets

(56) References Cited

U.S. PATENT DOCUMENTS

| | | | | |
|---|---|---|---|---|
| 5,461,797 | A * | 10/1995 | Royer | G01B 5/202 |
| | | | | 33/501.14 |
| 7,131,207 | B2 * | 11/2006 | McFarland | G01B 21/042 |
| | | | | 33/503 |
| 7,755,771 | B2 * | 7/2010 | Komori | G01B 11/2416 |
| | | | | 356/601 |
| 10,753,730 | B2 * | 8/2020 | Mies | G01B 11/2416 |
| 2006/0053646 | A1 * | 3/2006 | McFarland | G01B 21/042 |
| | | | | 33/503 |
| 2007/0291260 | A1 * | 12/2007 | Komori | G01B 11/2416 |
| | | | | 356/138 |
| 2014/0182150 | A1 | 7/2014 | Nishikawa et al. | |
| 2018/0236576 | A1 * | 8/2018 | Tachikawa | B23F 1/065 |
| 2019/0368863 | A1 * | 12/2019 | Mies | G01B 11/2416 |
| 2020/0292305 | A1 * | 9/2020 | Wagaj | G01B 11/2416 |
| 2020/0298362 | A1 * | 9/2020 | Finkeldey | G01B 11/06 |

* cited by examiner

MEASUREMENT OF TOOTHED ARTICLES UTILIZING MULTIPLE SENSORS

FIELD OF THE INVENTION

The invention related to the measurement of workpieces including gears and other toothed articles and in particular to such measurement utilizing multiple probes or sensors.

BACKGROUND OF THE INVENTION

For many years, tactile probes (also known as "contact" or "touch" probes) have been used in two categories of measuring instruments: coordinate measuring machines (CMM's) and gear measuring machines (GMM's), which can be differentiated according to their modes of operation. During measurement of a gear by a CMM, a tactile probe touches subject surfaces at selected locations (i.e. points) such as on tooth tips, tooth flanks, tooth roots, or some combination thereof. At each such contact the instrument gathers information about the coordinate location of the probe tip and, by further processing, the coordinates of each contact point can be deduced. Comparison of such contact point data with theoretical models of the test piece can then reveal deviations of the actual measured surface from the nominal. CMM's can be used to measure test piece form (shape), location, and by further processing, linear and angular relationships between selected features.

GMM methods are generally limited to measurement of involute helicoid gear tooth surfaces, which can thereby be inspected for form (shape), location, and by further processing, linear and angular relationships between selected tooth flank features. During measurement of gear tooth flank form by a GMM, a tactile probe is moved through space according to a predetermined linear path determined by the nominal geometry of the test gear. For most types of measurement, the test piece is simultaneously rotated according to a predetermined relative velocity according to nominal geometry of the test gear. These relative motions generate the defined nominal geometry of the subject test piece. Having used the instrument to generate the nominal geometry, any perturbations of the tactile probe as it is thereby moved across the surface of the test piece will be sensed by the instrument as deviations from that nominal. This method for testing tooth flank surfaces is based upon application of well-known special geometric characteristics of involute helicoid gears.

Tactile probes are also broadly used with a variety of measuring instruments to test shape, location, and relationships of many kinds of test piece features (e.g. journals).

Some of the most common characteristics measured on cylindrical (i.e. spur and helical) gears include (but are not limited to):
Index (Spacing) errors
Lead (Helix) errors
Profile (Involute) errors
Tooth thickness
Angular position of one gear tooth with respect to another gear tooth to a known feature such as keyway on gear shaft
Tooth topography
Waviness
Some of the most common characteristics measured on bevel (including straight, spiral and hypoid) gears include (but are not limited to):
Index (Spacing) errors
Deviation from theoretical location at defined points (e.g. 45 points at predefined locations) on gear surface.
Topographical measurements
Waviness Industry standards for gear measurements commonly recommend locations for measurements on a tooth surface. FIG. 1 illustrates an example of one tooth surface of a single tooth 2 of a spur gear where points 4, 6 and 8 are established in the lead (or lengthwise) direction of the tooth at the pitch diameter 12. Point 4 is located at the top edge of the tooth, point 6 is located at half the face width and point 8 is located at the bottom edge of the tooth. The points 4, 6, 8 define a line 16 in the lead direction (for helical gears it is a curve). Additional lines parallel to line 16 each with additional points may be also utilized for measurements. Measurements may be conducted at some or all of the established points and a contact probe may be moved along one or more lead lines (i.e. tooth trace) to measure the tooth.

In a similar manner, measurements may be made along one or more lines established in the profile (or involute) direction of a tooth. Such a line 18 is shown in FIG. 1 extending from a measurement start gear diameter 10 through half-width point 6 to outside diameter 14 at the edge of tooth tip 20. Additional lines parallel to line 18 each with additional points may be also utilized for measurements. Measurements may be conducted at some or all of the established points and a contact probe may be moved along one or more profile lines (i.e. tooth trace) to measure the tooth.

It should be understood that measurements are usually conducted on both sides of a tooth so the number of lead and profile tooth traces described above (one side only) actually doubles when both sides of a tooth are measured.

When measuring index and tooth thickness, measurements are preferably done at the pitch diameter in the middle of the face width. Hence, finding the gear surface and locating the precise inspection locations on gear surface is one of the important requirements of gear metrology.

In order to measure the characteristics identified above, a first step on a gear measuring machine (GMM) or a CMM involves precisely locating the teeth and surface of a gear with a contact probe with respect to the axes of the respective machine. Some factors which may influence the location of the teeth and gear surface include:
On a gear measuring machine, a gear may not be mounted at fixed radial location.
When a user mounts a gear on a measuring machine, the locations of the teeth may vary by large amount radially from one setup to another.
Based on the particular fixture used for part mounting, a gear may also be mounted at different height locations (usually in the vertical direction).
The above-described part movement as well as other external factors such as user influence must be taken in to account when measuring a part such as a gear.

In order to precisely locate a first tooth of a gear mounted on a GMM or CMM, a tactile probe performs steps which include (but may not be limited to):
Find the tooth gap. This is achieved by multiple ways by use of contact probe. One such method involves following steps:
1) Move contact probe in the X direction until it reaches the pitch point;
2) If the probe contacts the gear tooth before it reaches the pitch point, the gear is rotated by a small increment;

3) Steps 1 and 2 are repeated until the probe is clear of the tooth and reaches the pitch point in the desired tooth gap.

Find one flank of gear tooth at a required diameter;

Find the top and bottom edges of the gear tooth (optional or not applicable for some bevel gears);

Find a reference point on the gear surface at a required diameter and height on both flanks.

Once above steps are complete, other desired features on the gear teeth are measured. However, in instances where several tooth traces are utilized, which is common, considerable time is required to measure a tooth surface. When one considers that both sides of a tooth are measured and usually several teeth on a gear are measured, it becomes clear that measuring a gear with a tactile probe can be quite time consuming.

It is also known to measure certain parts by non-contact methods. Optical (e.g. laser) measuring and/or inspection of workpieces, such as gears, is disclosed in, for example, U.S. Pat. No. 4,547,674 to Pryor et al. However, with such optical methods, finding a tooth as well as the reference points (e.g. pitch point and tooth edge) is quite time consuming and is not as repeatable as touch probe. Also, accuracy of certain features with a non-contact probe is limited when compared to a tactile probe.

SUMMARY OF THE INVENTION

The invention is directed to a method and machine whereby utilizing both tactile and non-contact sensors (probes) for workpiece inspection and/or measurement results in significant cycle time savings while accuracy is maintained.

DETAILED DESCRIPTION OF THE PREFERRED EMBODIMENT

Figure 1:
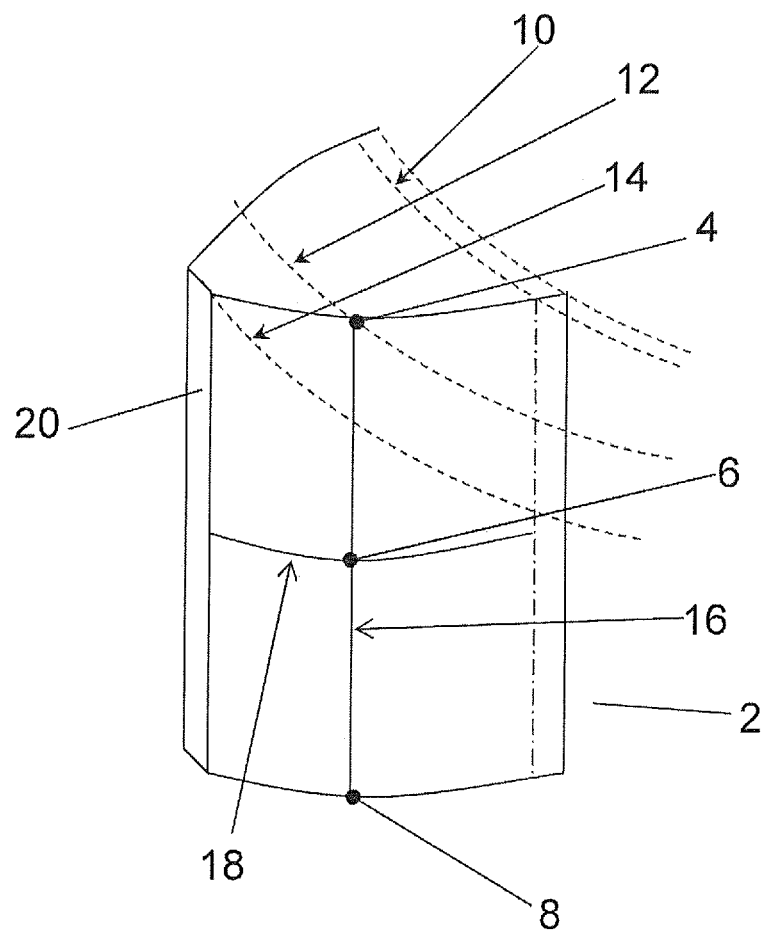
FIG. 1 illustrates an example of one tooth surface of a single tooth of a spur gear.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components will be referred to by like reference numbers. For a better understanding of the invention and ease of viewing, doors and any internal or external guarding of machines have been omitted from the drawings.

The use of "including", "having" and "comprising" and variations thereof herein is meant to encompass the items listed thereafter and equivalents thereof as well as additional items. Although references may be made below to directions such as upper, lower, upward, downward, rearward, bottom, top, front, rear, etc., in describing the drawings, these references are made relative to the drawings (as normally viewed) for convenience. These directions are not intended to be taken literally or limit the present invention in any form.

Figure 2:
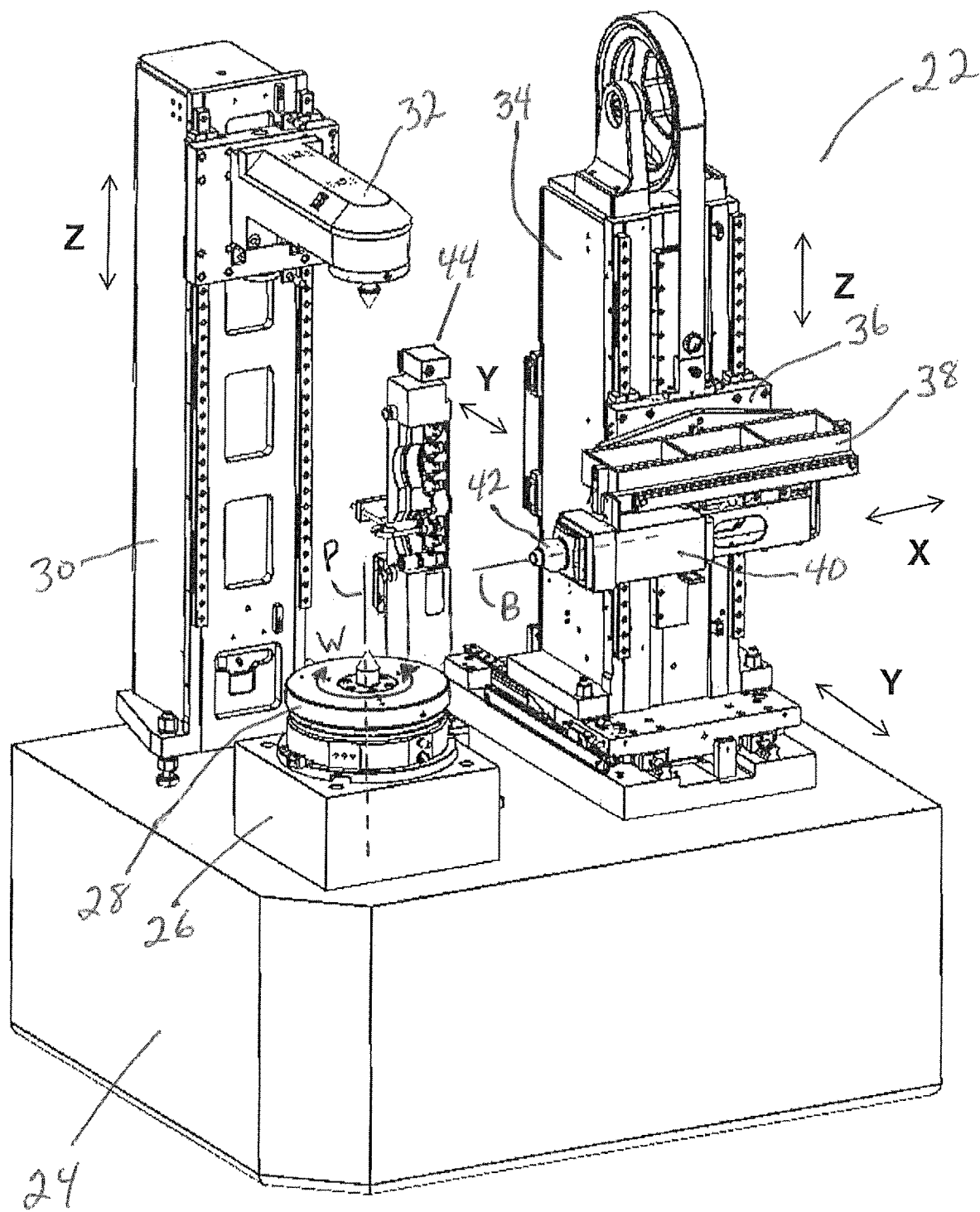
FIG. 2 shows an analytical measuring and inspection machine for gears, tools and other types of complex-shaped workpieces.

FIG. 2 shows an gear measuring machine (GMM) 22 for the analytical measuring and inspection of gears, tools (e.g. cutting tools such as hobs) and other types of complex-shaped workpieces, particularly workpieces comprising teeth. Machine 22 comprises a base 24, workpiece spindle support base 26 and workpiece spindle 28. A workpiece, such as a spur or helical gear, is positioned on spindle 28 via suitable workholding equipment (not shown) as is understood by the skilled artisan. The workpiece is rotatable in either direction W about a workpiece axis P. If desired, a tailstock column 30 and tailstock 32 may be included with the height of tailstock 32 being adjustable along the height of column 30 in the vertical direction Z.

Machine 22 further includes a probe column 34 located on base 24. Probe column 34 is movable horizontally on base 24 in the Y direction. A support head 36 is positioned on probe column 34 and is movable along column 34 in the Z direction.

Support bracket 38 is attached to support head 36 and a probe housing 40 is attached to support bracket 38. Probe housing 40 is movable horizontally in the X direction along probe axis B and includes an indexable probe support head 42 on which a probe is positioned. Probe support head 42 is indexable about axis B as well as about an axis A (FIG. 5) wherein axis A extends in the Y direction and is oriented perpendicular to axis B. For purposes of reference in FIG. 2, directions X, Y and Z are preferably mutually perpendicular to one another, workpiece axis P extends in the Z direction and probe axis B extends in the X direction.

Machine 22 may further include a probe storage and exchange mechanism 44 which may be stationary but is preferably movable on base 24 in the Y direction so as to be positionable adjacent probe support head 42 at such time when an exchange of probes is necessary.

Linear movement of the machine components in their respective X, Y and/or Z directions as well as rotational and/or angular motion around and/or about the A, B and P axes are imparted by separate respective drive means (e.g. motors) which are not shown. Machine components are capable of independent movement with respect to one another or may move simultaneously with one another. Each of the drive means is preferably associated with a feedback device (not shown) such as a linear or rotary encoder as part of a CNC system which governs the operation of the drive means in accordance with instructions input to a computer controller (i.e. CNC) such as a B&R Model No. X20CP1586 (not shown).

Figure 3:
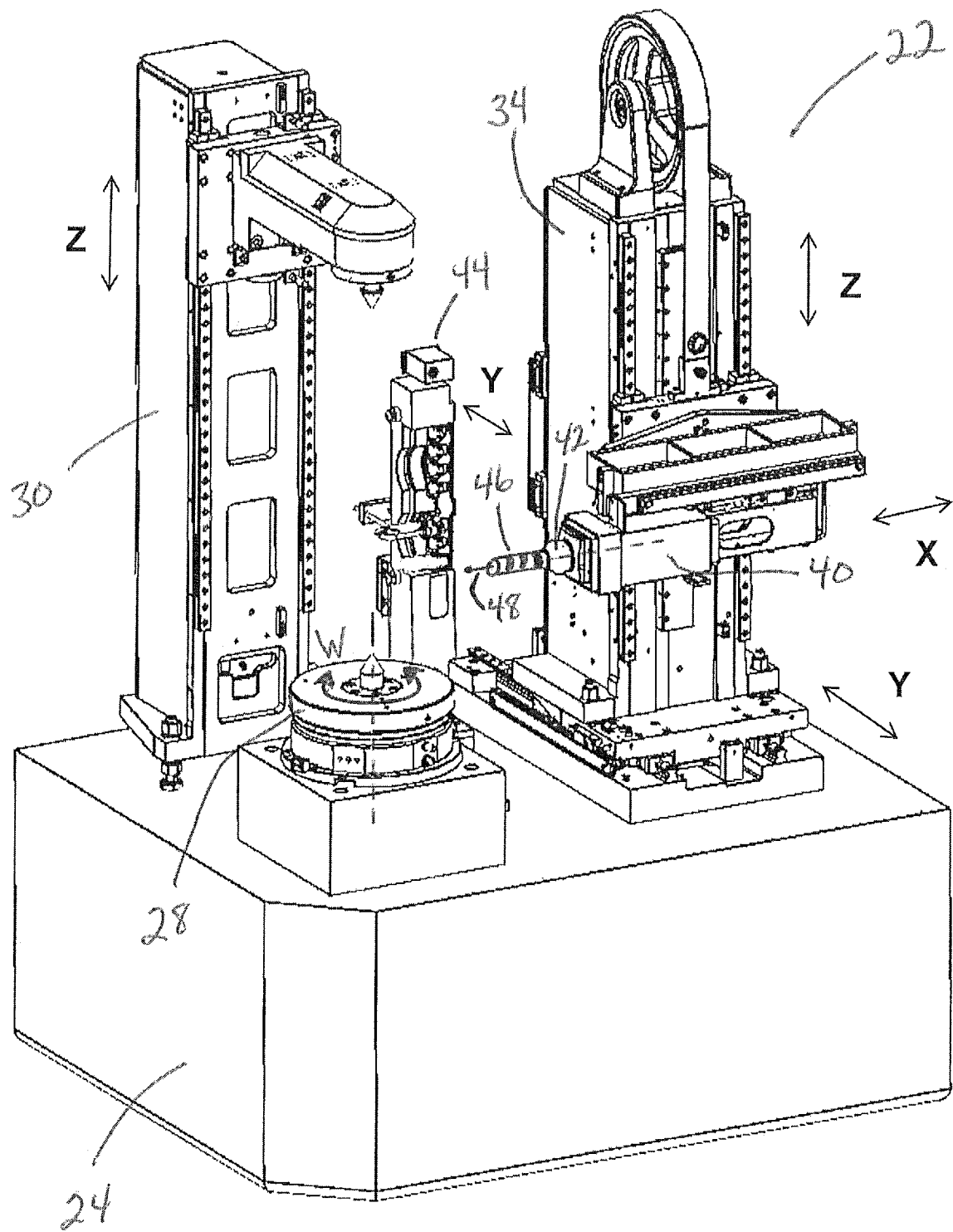
FIG. 3 shows the machine of FIG. 2 with the placement of a tactile probe on the probe support head of the machine.

FIG. 3 shows the same machine 22 as in FIG. 2 but with the placement of a tactile probe 46 on probe support head 42. Tactile probe 46 usually includes a spherical tip 48 generally comprised of a ruby. Probe 46 can be replaced with a diamond tipped probe 52 (FIG. 6) which may be moved along the surface of a workpiece to measure surface roughness (i.e. surface finish). Alternatively, a probe known as a Barkhausen probe 54 (FIG. 6) may be positioned on probe support head 42 for the detection of burns on a workpiece surface resulting from grinding. When not in use, tactile probe 46, diamond tipped probe 52 and the Barkhausen probe 54 are preferably located on the probe storage and exchange mechanism 44.

The previous discussion relating to FIGS. 2 and 3 describe the current state of the art regarding analytical measuring and inspection machines for gears, tools and other types of complex-shaped workpieces. As mentioned above, in instances where several tooth traces are utilized, which is common, considerable time is required to measure a tooth surface utilizing only a tactile probe.

The inventors have discovered that by utilizing both tactile and non-contact sensors (probes) for workpiece measurement and/or inspection, significant cycle time savings can be realized. It should be noted that in the context of this specification, the terms "probe" and "sensor" are interchangeable unless specifically stated otherwise.

Figure 4:
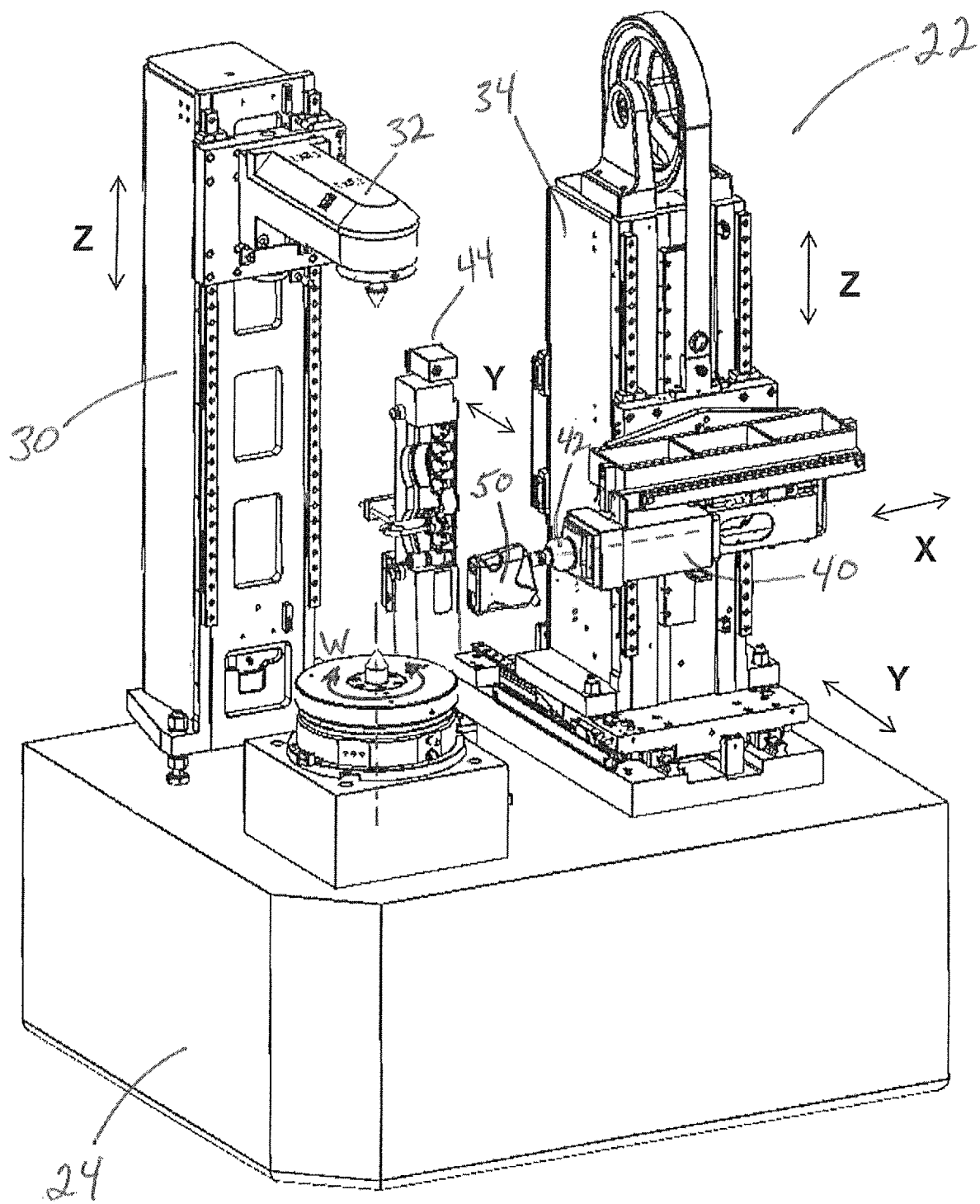
FIG. 4 illustrates the machine of FIG. 2 with the inclusion of a non-contact probe such as a laser probe.

FIG. 4 illustrates the machine 22 as shown in FIG. 2 but with the inclusion of a non-contact probe 50 such as an optical probe, particularly a laser probe. As with other types of probes utilized on machine 22, probe 50 may be housed in the probe storage and exchange mechanism 44 when not in use. Preferably, the probe 50 utilizes a 3-D laser scanner which, more preferably, projects a laser line onto the tooth surfaces of a part. Other types of applicable non-contact probes, (e.g. optical probes) are also contemplated.

Figure 5:
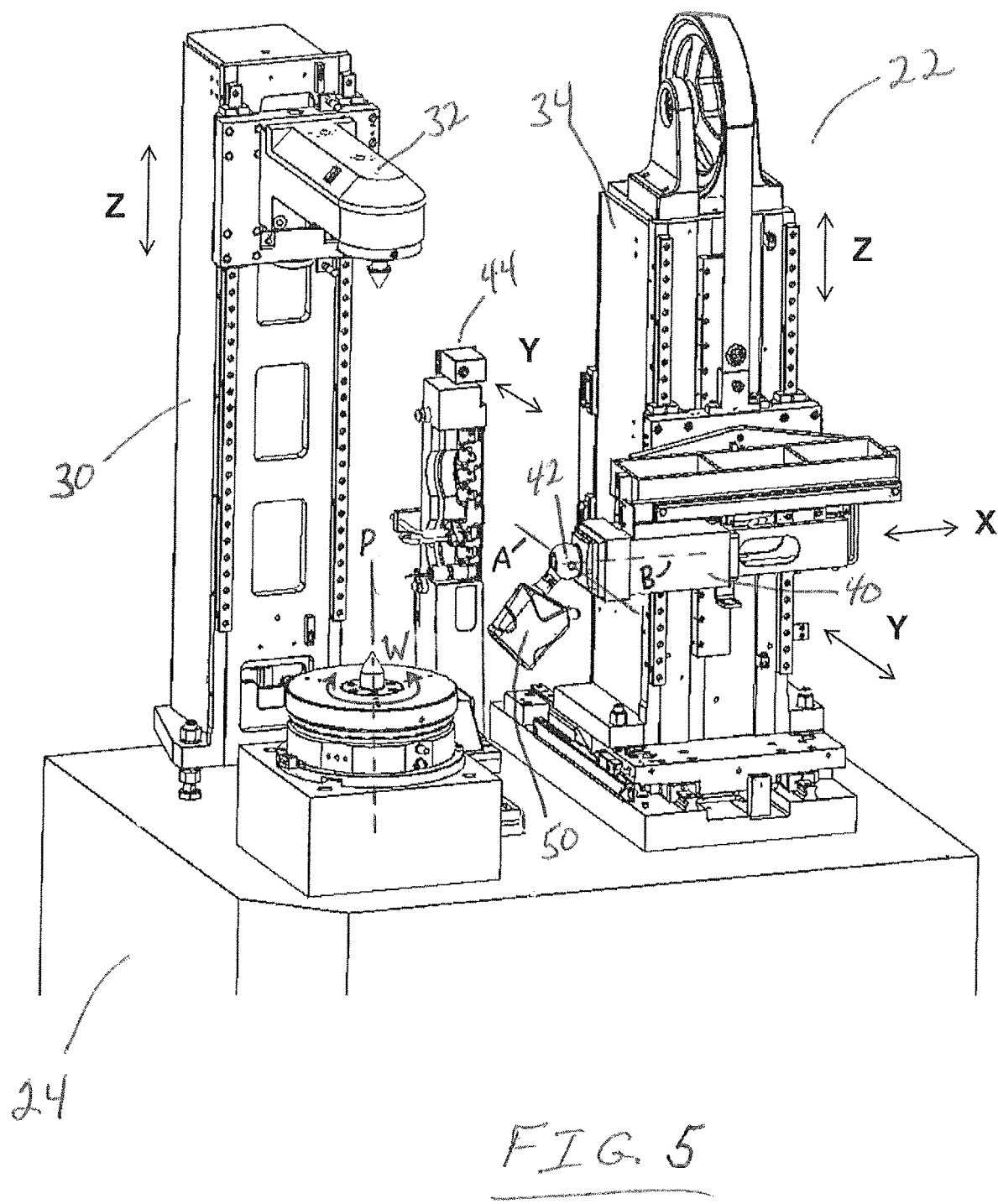
FIG. 5 shows the machine of FIG. 4 with the non-contact probe oriented in an angular position.

FIG. 5 shows probe 50 oriented in an angular position via indexable probe support head 42 which enables angular orientation of a probe about one or more axes, particularly the A and/or B axes which are preferably oriented perpendicular to one another and lie in the same plane, preferably a horizontal plane.

Figure 6:
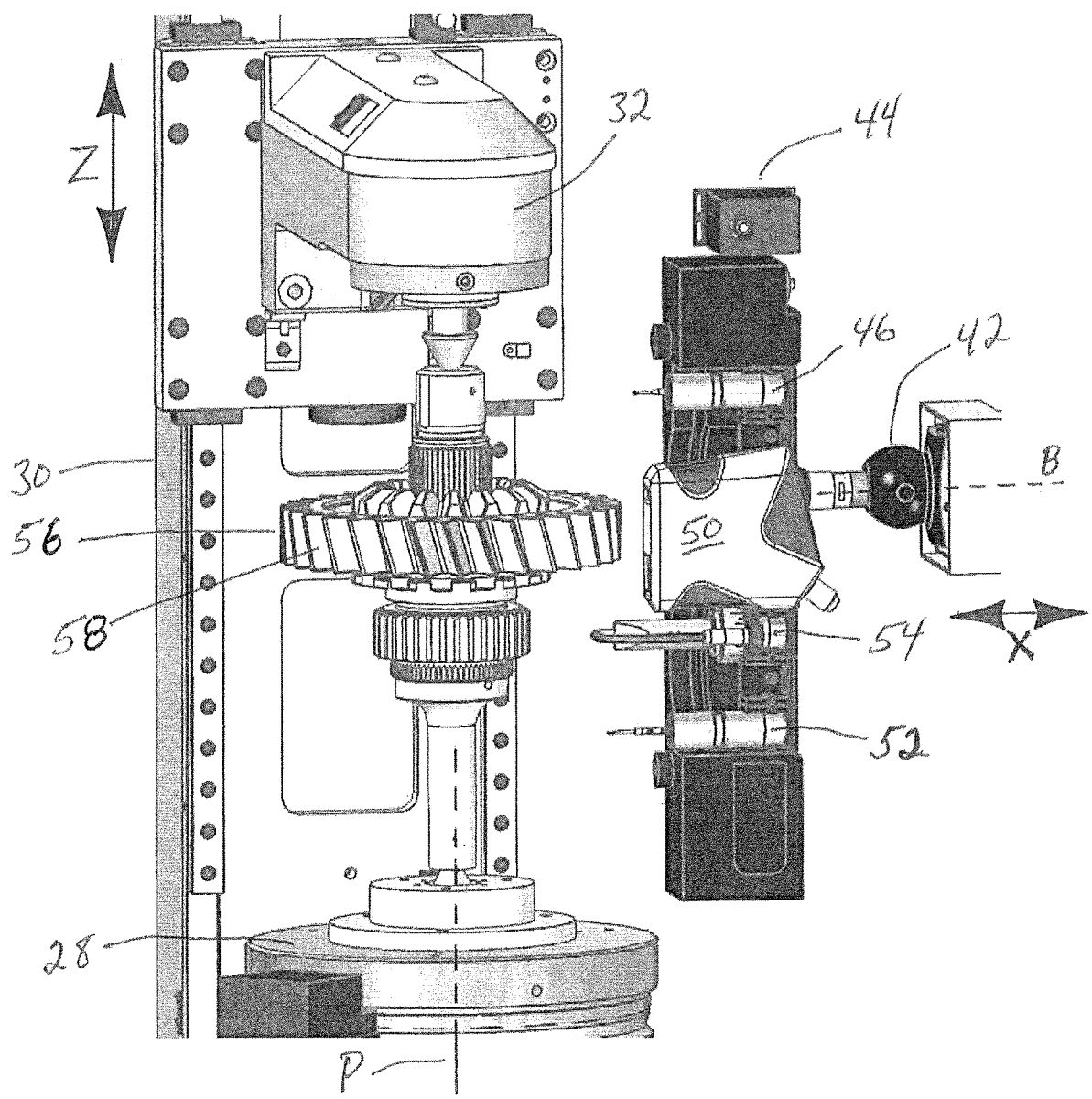
FIG. 6 shows a non-contact probe positioned adjacent to a helical gear.

FIG. 6 shows a non-contact probe 50 positioned adjacent to a helical gear 56 for scanning the surfaces of the teeth 58 which is accomplished by moving the probe in the Z direction along the length of the teeth while the gear rotates about the P axis so as to scan the entire surface of all teeth.

In a preferred embodiment, a method has been developed wherein a tactile probe is utilized to find a gear tooth as well as to identify the location of desired (i.e. predetermined) reference points thereon. As mentioned above, one series of steps for finding the first tooth includes:
  Finding the tooth gap;
  Finding one flank of the gear tooth at required diameter;
  Finding the top and bottom edges of the gear tooth;
  Finding a reference point on the gear surface at a required diameter and height on both tooth flanks.
Of course, other steps or series of steps may be carried out in order to find a first tooth on a workpiece as can be appreciated by the skilled artisan.

Once the reference point data is determined, the position and path of a non-contact probe, such as a laser probe, is adjusted in accordance with reference point data to scan the surface of the teeth. Desired features from the data collected by the non-contact probe are then extracted.

Since a tactile probe is used to find and locate the first tooth, this has several advantages including:
  Finding first tooth with tactile probe is faster
  Position of a gear can be random radially with reference to P-axis which extends in the Z direction.
  Tooth thickness reported by tactile probe at a given pitch point is used which is more accurate.
  Use of both probing technologies on a workpiece provides flexibility to use a tactile probe for certain characteristics and to use non-contact probe data for others.

Another advantage of the inventive method is a reduction in cycle time while maintaining required accuracy. For example, use of an index test with a tactile probe and use of a non-contact probe for lead and profile is much faster than using a non-contact probe for all operations. This is very advantageous for gears with large numbers of teeth.

Figure 7A:
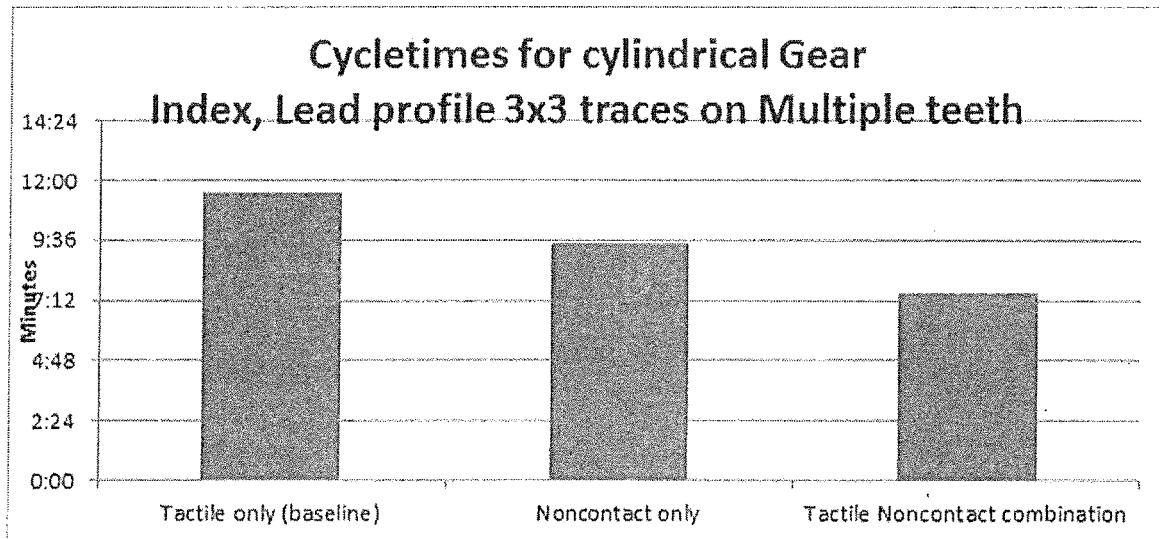
FIG. 7A illustrates a comparison of gear probing cycle time for each of tactile only probing, non-contact only probing and a combination of tactile and non-contact probing.

FIG. 7A illustrates a comparison of cycle time for each of tactile only probing, non-contact only probing and a combination of tactile and non-contact probing of a 36 teeth helical gear with a normal module of 3.7. The comparison test comprised:
  Index test—Both flanks of each of the 36 teeth at the pitch point;
  Lead test—3 traces on each of 4 teeth (both flanks of each tooth);
  Profile test—3 traces on the same 4 teeth (both flanks of each tooth).

Using only a tactile probe, the cycle time for the described test is about 11 minutes and 30 seconds. For only the non-contact probe, the cycle time for the test was about 9 minutes and 30 seconds. However, the test utilizing a combination of tactile and non-contact probes resulted in a cycle time of about 7 minutes and 30 seconds.

Figure 7B:
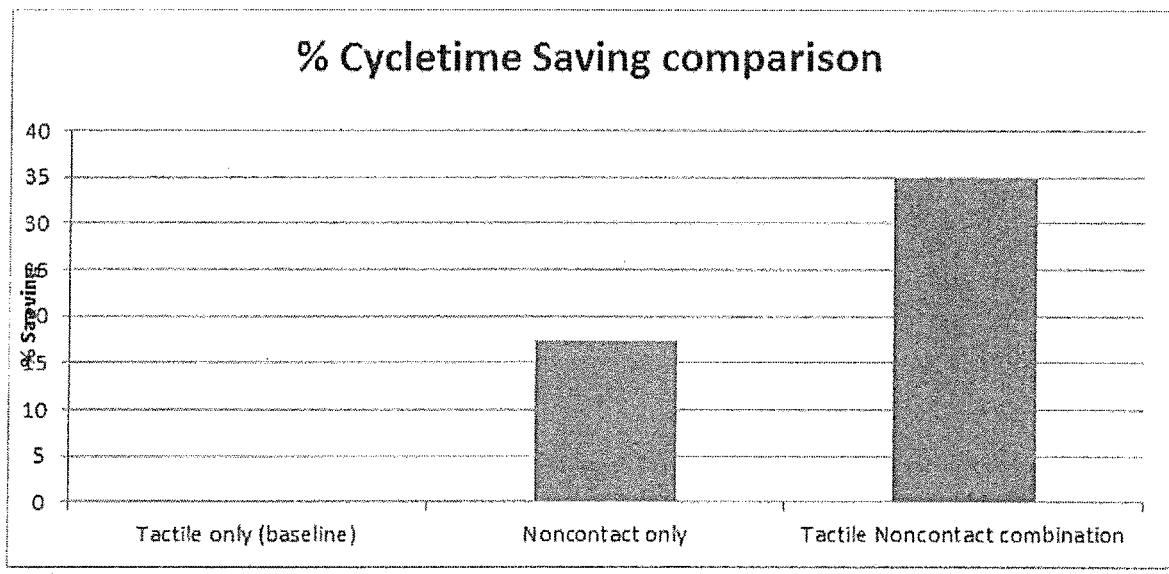
FIG. 7B shows cycle time saving for gear probing by non-contact only probing and a combination of tactile and non-contact probing compared to tactile only probing.

FIG. 7B shows that while the non-contact only probing results in an 18% saving of cycle time compared to the tactile only probing. The combination probing of the invention resulted in a cycle time savings of 35% compared to tactile only probing. Of course it can be understood that for cycles comprising a higher number of lead and profile traces and/or for a higher number of teeth subject to lead and profile testing, the cycle time savings of the invention compared to tactile only probing will be considerably larger.

Additionally, certain features on gear surfaces as well as reference surfaces may not be available by non-contact probing due to the geometry of a part. For example, deep internal splines can only be inspected with tactile a probe. Another example is journal measurement of long internal bores with small diameters. It may not be possible to measure these internal bores since light from a non-contact probe may not be able to reach the internal journal surface. The invention enables use of a tactile probe to measure these surfaces. Since these surfaces may also be used as a reference to establish a part axis, the invention allows use of a tactile probe during initial setup which involves journal measurement along with finding the first tooth and then switching to a non-contact probe for other measurements. Gear part assemblies consisting of two gears or internal splines and external gears may have a requirement to measure timing (angular) relationship of both parts with respect to each other when in mesh. The invention allows measurement of relationships of this type by use of both probing technologies which is otherwise not possible by a non-contact only probe.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of measuring and/or inspecting a workpiece having teeth on a measuring and inspection machine, said method comprising:
    positioning a workpiece on said machine such that the toothed workpiece is rotatable about a workpiece axis,
    probing said workpiece with a tactile probe located on said machine, said probing said workpiece with a tactile probe comprises finding a tooth on said workpiece and identifying the location of desired reference points on said tooth,
    probing said workpiece with a non-contact probe located on said machine, said probing said workpiece with a non-contact probe comprises scanning the surface of said teeth, wherein said non-contact probe is positioned for scanning based on the desired reference points locations established by said tactile probe.

2. The method of claim 1 wherein said non-contact probe comprises a laser probe.

3. The method of claim 1 wherein said workpiece comprises a gear.

4. The method of claim 1 wherein said workpiece comprises a gear part assembly having two toothed parts.

5. The method of claim 1 wherein said workpiece comprises internal splines or an internal bore.

* * * * *